April 12, 1927.
L. A. LEPPKE ET AL
1,624,741
DISPLAY DEVICE
Filed Dec. 10, 1926
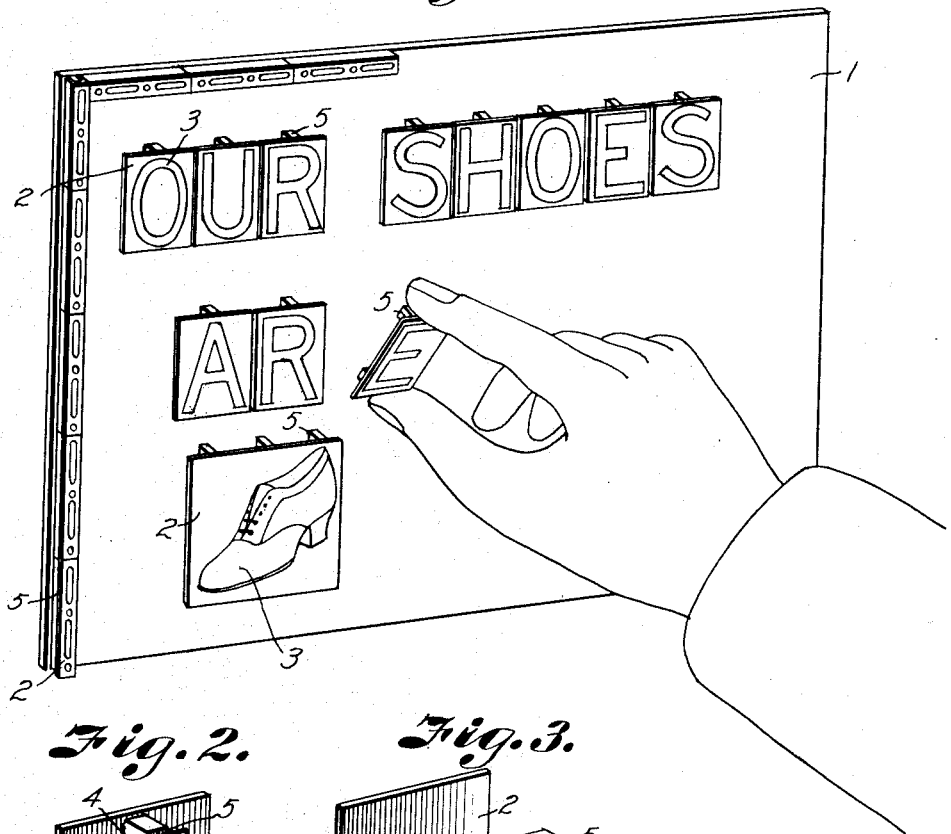
INVENTORS
Louis A. Leppke.
and John Harry Scharf
BY Arthur C. Brown
ATTORNEY Patented Apr. 12, 1927.

1,624,741

UNITED STATES PATENT OFFICE.

LOUIS A. LEPPKE AND JOHN HARRY SCHARF, OF OMAHA, NEBRASKA.

DISPLAY DEVICE.

Application filed December 10, 1926. Serial No. 153,821.

Our invention relates to improvements in display devices, particularly to that class of display devices in which the objects are retained upon the display surface by other than complicated mechanical means, so that the objects displayed are readily applied and removed.

One purpose of our invention is to provide a display device in which one motion, that of placing the display object in the desired position, will effect the fixing and one motion will effect the removal of the object in relation to the display surface, thus eliminating the various motions necessary when hooks, clips, clamps or other mechanical means are employed to fix such objects to the display surface.

Another object of our invention is to provide a device by which any object may be attached to the display surface at any location and at any angle without other motion than the placing of the object on the surface, the objects being removable by a single motion also, thus eliminating all mechanical means from the process of attaching and removing display objects in relation to display surfaces.

A further object of our invention representing specifically its improvement in the art, is to provide a display device in which objects of any size and shape suitable for display upon a desired size and shape of display surface may be arranged in any position, relation or angle desired. Our invention therefore, provides an easily and quickly variable display device having a wide range of uses including the display of letters and other indicia of signs, characters for display in educational processes and articles of commerce.

The results are accomplished in our invention by improved and different details of structure, the preferred forms of which are illustrated in the accompanying drawings in which:

Fig. 1 is a perspective view of a device embodying the present invention.

Fig. 2 is a perspective view of one of the object holders.

Fig. 3 is a group perspective view illustrating the assemblage of object holders.

Fig. 4 is a vertical sectional view through one of the assembled object holders.

Fig. 5 is a horizontal sectional view therethrough.

Fig. 6 is a perspective view illustrating a modified form of the invention.

Fig. 7 is a vertical sectional view taken substantially on the line 7—7 of Fig. 6, looking in the direction indicated by the arrows.

Fig. 8 is a perspective view of a modified form of object holder.

Referring in detail to the drawings:

1 designates a background or "board" which may be of any suitable size and shape for displaying a sign and of a material capable of receiving and retaining a magnetic charge, so that it may serve either as the keeper of a number of relatively small, permanent magnets, or may itself attract and hold a plurality of relatively small armatures by magnetic induction. In the following description we will refer to the "board" as a keeper, and to the mounting members as magnets, but without intention of limiting the scope of the invention to that arrangement to the exclusion of the reverse.

2 designates a base on which is mounted an object of display 3, such object being formed integrally with base or attached thereto by suitable means. 4 is a magnetizable body having a plurality of pole members 5. 6 is a plate of material having affinity for the material of the base 2 and that can easily be glued, soldered or otherwise secured thereto. The plate 6 is bent to produce a socket 7, the plane of said base being preserved, socket 7 being designed in shape and position for the reception of the magnetizable body 4. The magnetizable body 4 may be provided with corrugations or roughening 8 on the side opposite its pole members 5. Figs. 6 and 7 represent variations in form in which the base 2 is bent as at 9 to meet the plate 6, as contrasted with the preferred form in which the plate 6 is bent to meet the base 2. In such variable form plate 6 is provided with apertures 10 through which a plurality of poles 5 may be extended. 11 represents the means of securing plate 6 to base 2, preferably by glue, although rivets may be employed.

The parts of the object holder are assembled as follows:

Base 2 is provided of suitable size for such use of the display device as may be desired, and of appropriate material such as celluloid, wood, paper or metal; the choice of material being by the use of this device rendered unrestricted. The object to be displayed may be made integral with the base or may be mounted upon said base. The magnetizable body is then placed in position against the under side of said base and opposite to the surface that bears the object, and such magnetizable body may be glued to the base, the holding process being facilitated by the corrugations 8 that may be provided. The plate 6 is then applied, the socket 7 fitting over the magnetizable body 4, poles 5 of said body protruding in a direction relatively perpendicular to said base.

The inner surface of plate 6 contacts the under surface of base 2. Plate 6, preferably of material having affinity for base 2, is preferably attached to base 2 by means of glue.

In the variable form shown in Figs. 6 and 7, plate 6 is provided of a size relatively the same as the size of base 2, and has a plurality of apertures 10. The magnetizable body 4, in this form, is relatively large and is provided with a relatively large number of poles. The body 4 is embraced by the base 2 and the plate 6, the pole members 5 extending through the provided apertures 10 in plate 6. Such variation is designed for the use of the device in the display of objects relatively large and heavy. Another variation shown in Fig. 8 may be employed when the base is an oblong having relatively long sides. In such case the plate 4 is constructed so as to extend substantially the length of the base. An important feature of this variation consists in the fact that the pole members of the magnetizable body are relatively longer than the body. The effect may be differently expressed by referring to the poles as the parallel sides of the body extended therefrom to form the protruding shoulders for contacting the body with the display surface.

Other variations (not shown) may be produced by the use of the elements shown and the method described, without departing from the spirit of this invention. Material of suitable character may be interposed at suitable situations to adjust the device to the effect of disturbance of magnetic lines due to the use of preferred materials and incidental mechanisms. The device may be produced without display objects, and suitable means may be provided on the base for the attachment of objects, thus providing additional flexibility in the employment of the fundamental elements of this invention.

Further describing the assembly of the different features of the device:

The board 1 is provided, of suitable size and shape, and of material designed to complement the magnetic or non-magnetic character of the object holders. The object holders may be arranged on the board to form the words and effects of a sign, to represent a proposition in a lesson, or to illustrate an example in a process of instruction, for example, the arrangement of rules in a sample advertisement displayed to a class studying advertising. The magnetizable bodies will adhere to the board in any position in which they are placed. When the display has served its purpose the object holders may be removed or they may be readjusted or changed in part to meet the momentary requirement of the operator.

It is apparent that, if desired, the board 1 may be made of hardened metal and charged to constitute the magnet and the bodies heretofore referred to as magnetizable bodies, may be made of soft metal to constitute the keepers or armature members, in which case a magnetic induction will be set up when the body enters the field of the magnet and the object holders will be held to the board, the manipulation being identical with that described in the other plan.

It is also apparent that the angular position of the objects on the base may be varied, and that the angle of incidence of the object holder to the base may be varied by changing the form of the poles 5.

What we claim and desire to secure by Letters Patent is:

1. In a display device, a background having keeper characteristics, an object holder, comprising a base, a magnetizable body, and a plate, said plate securing said base to said magnetizable body.

2. In a display device, a background having keeper characteristics, an object holder, comprising a base, a magnetizable body, comprising poles extended from the body, and a plate securing said magnetizable body to the said base.

3. In a display device, a background having keeper characteristics, an object holder comprising a base, a magnetizable body, having poles extended to form lugs, a plate securing said base to said magnetizable body, said base and said plate being of materials having affinity for each other.

4. In a display device, a background having keeper characteristics, an object holder, comprising a base, a magnetizable body, the body having a plurality of poles, the poles being extended to form lugs, the number and shape of said poles being adjusted to the size and shape of the base, and a plate, securing said magnetizable body to said base, said plate and base being of non-magnetic material.

5. In a display device, a background having keeper characteristics, an object holder, comprising a base, a magnetizable body, the body having a plurality of poles of desired shape and length, the poles being extended to form lugs, the number and shape of said poles being adjusted to the size and shape of the base, and a plate, the plate having a socket, the magnetizable body seated in said socket, the plate securing said magnetizable body to said base, said plate and base being of non-magnetic material.

In testimony whereof we affix our signatures.

LOUIS A. LEPPKE.
JOHN HARRY SCHARF.